United States Patent
Liu et al.

(10) Patent No.: US 7,742,867 B2
(45) Date of Patent: *Jun. 22, 2010

(54) STRATEGY FOR FUELING A DIESEL ENGINE BY SELECTIVE USE OF FUELING MAPS TO PROVIDE HCCI, HCCI+CD, AND CD COMBUSTION MODES

(75) Inventors: Zhengbal Liu, Naperville, IL (US); Puning Wei, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 541 days.

This patent is subject to a terminal disclaimer.

(21) Appl. No.: 11/570,352

(22) PCT Filed: Jun. 22, 2005

(86) PCT No.: PCT/US2005/022296

§ 371 (c)(1),
(2), (4) Date: Dec. 11, 2006

(87) PCT Pub. No.: WO2006/002321

PCT Pub. Date: Jan. 5, 2006

(65) Prior Publication Data

US 2008/0027618 A1    Jan. 31, 2008

(51) Int. Cl.
*F02D 28/00* (2006.01)

(52) U.S. Cl. ...................................... 701/104

(58) Field of Classification Search .................. 701/104, 701/102, 103, 105, 101; 123/295, 305
See application file for complete search history.

(56) References Cited

U.S. PATENT DOCUMENTS

| | | | | |
|---|---|---|---|---|
| 6,390,054 | B1 * | 5/2002 | Yang | 123/295 |
| 6,662,785 | B1 * | 12/2003 | Sloane et al. | 123/481 |
| 6,684,849 | B2 * | 2/2004 | zur Loye et al. | 123/295 |
| 6,840,209 | B2 * | 1/2005 | Shimazaki | 123/305 |
| 6,957,640 | B1 * | 10/2005 | Liu et al. | 123/305 |
| 7,021,276 | B2 * | 4/2006 | Liu et al. | 123/299 |
| 7,121,255 | B2 * | 10/2006 | Liu et al. | 123/305 |

* cited by examiner

*Primary Examiner*—Hieu T Vo
(74) *Attorney, Agent, or Firm*—Jack D. Nimz; Jeffrey P. Calfa

(57) ABSTRACT

A compression ignition engine (20) has a control system (26) for processing data, one or more combustion chambers (22), and fuel injectors (24) for injecting fuel into the chambers (22). The control system (26) controls fueling using a result of the processing of certain data, such as engine speed and engine load, to select one of three fueling modes (HCCI, HCCI+CD, CD) for operating the engine (20). When the result of the processing selects the HCCI mode, the engine (20) is fueled to cause homogeneous-charge compression-ignition (HCCI) combustion in all combustion chambers (22). When the result of the processing selects the HCCI+CD mode, the engine (20) is fueled to cause HCCI combustion in some chambers (22) and CD (conventional diesel) combustion in the remaining chambers (22). When the result of the processing selects the CD mode, the engine (22) is fueled to cause CD combustion in all chambers (22).

22 Claims, 3 Drawing Sheets

STRATEGY FOR FUELING A DIESEL ENGINE BY SELECTIVE USE OF FUELING MAPS TO PROVIDE HCCI, HCCI+CD, AND CD COMBUSTION MODES

FIELD OF THE INVENTION

This invention relates generally to internal combustion engines. More specifically it relates to a control strategy for selectively utilizing homogeneous-charge compression-ignition (HCCI) in a way that takes advantage of HCCI's attributes in different ways during different modes of engine operation. More specifically the invention relates to a strategy for fueling an engine to cause HCCI combustion in all cylinders during a first mode, to cause HCCI combustion in less than all cylinders and CD (conventional diesel) combustion in the remaining cylinders during a second mode, and CD combustion in all cylinders during a third mode.

BACKGROUND OF THE INVENTION

HCCI is a known process for fueling a diesel engine in a manner that creates a substantially homogeneous air-fuel charge inside an engine cylinder during a compression upstroke of an engine cycle. After a desired quantity of fuel for the charge has been injected into the cylinder to create a substantially homogeneous air-fuel mixture, the increasing compression of the charge by the upstroking piston creates sufficiently large pressure to cause auto-ignition of the charge. In other words, the HCCI mode of operation of a diesel engine may be said to comprise 1) injecting a desired amount of fuel into a cylinder at an appropriate time during the compression upstroke so that the injected fuel mixes with charge air that has entered the cylinder during the preceding intake downstroke and early portion of the compression upstroke in a manner that forms a substantially homogeneous mixture within the cylinder, and then 2) increasingly compressing the mixture to the point of auto-ignition near or at top dead center (TDC). Auto-ignition may occur as the substantially simultaneous spontaneous combustion of vaporized fuel at various locations within the mixture. No additional fuel is injected after auto-ignition.

One of the attributes of HCCI is that relatively lean, or dilute, mixtures can be combusted, keeping the combustion temperatures relatively low. By avoiding the creation of relatively higher combustion temperatures, HCCI can yield significant reductions in the generation of $NO_x$, an undesired constituent of engine exhaust gas.

Another attribute of HCCI is that auto-ignition of a substantially homogeneous air-fuel charge generates more complete combustion and consequently relatively less soot in engine exhaust.

The potential benefit of HCCI on reducing tailpipe emissions is therefore rather significant, and consequently HCCI is a subject of active investigation and development by many scientists and engineers in the engine research and design community.

One aspect of HCCI seems to impose a limit on the extent to which it can provide drastically reduced tailpipe emissions of soot and $NO_x$. At higher engine speeds and larger engine loads, the rate of combustion is difficult to control. Consequently, known engine control strategies may utilize HCCI only at relatively lower speeds and smaller engine loads. At higher speeds and/or larger loads, the engine is fueled so that the fuel combusts by conventional diesel (CD) combustion upon being injected into charge air that has been compressed within a cylinder to a pressure that is sufficiently great to cause the fuel to combust as it is being injected.

With the advent of processor-controlled fuel injection systems capable of controlling fuel injection with precision that allows fuel to be injected at different injection pressures, at different times, and for different durations during an engine cycle over the full range of engine operation, a diesel engine becomes capable of both CD combustion and HCCI combustion.

As will be explained by later description, the present invention takes advantage of the capabilities of those fuel injection and processing systems to control fuel injections in different ways depending on certain aspects of engine operation. Exactly how any particular fuel injection system will be controlled by an associated processing system in any given engine will depend on specifics of the engine, the fuel injection system, and the processing system.

Because a diesel engine that powers a motor vehicle runs at different speeds and loads depending on various inputs to the vehicle and engine that influence engine operation, fueling requirements change as speed and load change. An associated processing system processes data indicative of parameters such as engine speed and engine load to develop control data for setting desired engine fueling for particular operating conditions that will assure proper control of the fuel injection system for various combinations of engine speed and engine load.

U.S. patent application Ser. No. 10/809,254, filed 25 Mar. 2004, discloses a diesel engine and associated processor-controlled fuel injection system that processes certain data to select one of plural fueling modes for operating the engine. When a result of the processing selects a first fueling mode (HCCI mode), the engine is fueled during an engine cycle to create a substantially homogeneous air-fuel charge within one or more combustion chambers. That charge is compressed to combust by auto-ignition, with no more fuel being introduced after auto-ignition. When a result of the processing selects a second fueling mode (HCCI–CD mode), the engine is fueled during an engine cycle to create a substantially homogeneous air-fuel charge within the one or more combustion chambers. That charge is compressed to combust by auto-ignition (HCCI), after which more fuel is introduced into the one or more combustion chambers to provide additional combustion (CD). That engine utilizes HCCI combustion at relatively smaller loads and relatively smaller speeds and what is referred to as HCCI–CD combustion at relatively larger loads and relatively larger speeds.

SUMMARY OF THE INVENTION

The present invention relates to an engine, system, and method for enhancing the use of HCCI combustion in a diesel engine toward objectives that include further reducing the generation of undesired constituents in engine exhaust, especially soot and $NO_x$, and further improving thermal efficiency. The invention is embodied in the fuel injection control strategy, a strategy that is programmed in an associated processing system.

According to principles of the present invention, the utilization of HCCI combustion occurs in a different manner from that described in U.S. patent application Ser. No. 10/809,254. The present invention comprises three distinct modes of engine operation: 1) an HCCI mode; 2) an HCCI+CD mode; and 3) a CD mode. Each of these modes will be explained in detail hereinafter.

The HCCI mode is utilized at relatively smaller loads and relatively lower speeds. The HCCI+CD mode is utilized at relatively larger loads than those of the HCCI mode and at relatively higher speeds than those of the HCCI mode. The CD mode is utilized at still relatively larger loads than those of the HCCI+CD mode and at still relatively higher speeds than those of the HCCI+CD mode.

The HCCI+CD mode enables the benefits of HCCI to be obtained in a portion of the engine operating range between the portion of the range where HCCI is exclusively used and the portion of the range where CD is exclusively used.

One generic aspect of the present invention relates to a method of operating a compression ignition engine wherein certain data is processed to select one of plural fueling modes for operating the engine.

When the result of the processing selects a first fueling mode, each of multiple combustion chambers is fueled to create a substantially homogeneous air-fuel charge within each such combustion chamber during a corresponding engine cycle and each charge is then compressed to auto-ignition without introducing any additional fuel after auto-ignition during that corresponding engine cycle.

When the result of the processing selects a second fueling mode, a first group of the combustion chambers is fueled to create a substantially homogeneous air-fuel charge within each combustion chamber of the first group during a corresponding engine cycle such that for any given engine speed, the amount of fuel delivered into each combustion chamber of the first group is a function of engine speed but not engine load, and the charges are compressed to auto-ignition without introducing any additional fuel after auto-ignition during that corresponding engine cycle. A second group of the combustion chambers is fueled by introducing fuel at a time during the engine cycle when air in the corresponding combustion chamber of the second group has been compressed sufficiently to cause the fuel to combust as it is being introduced.

When the result of the processing selects a third fueling mode, each of the combustion chambers is fueled by introducing fuel at a time during the engine cycle when air in the corresponding combustion chamber has been compressed sufficiently to cause the fuel to combust as it is being introduced.

A further generic aspect relates to a compression ignition engine that operates according to the method just described.

In disclosed embodiment of the invention, the data that is processed for selecting the particular mode comprises engine speed data and engine load data. Injection pressure, duration, and timing may differ from mode to mode. Fueling data for each of the various modes are contained in maps in the engine control system.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
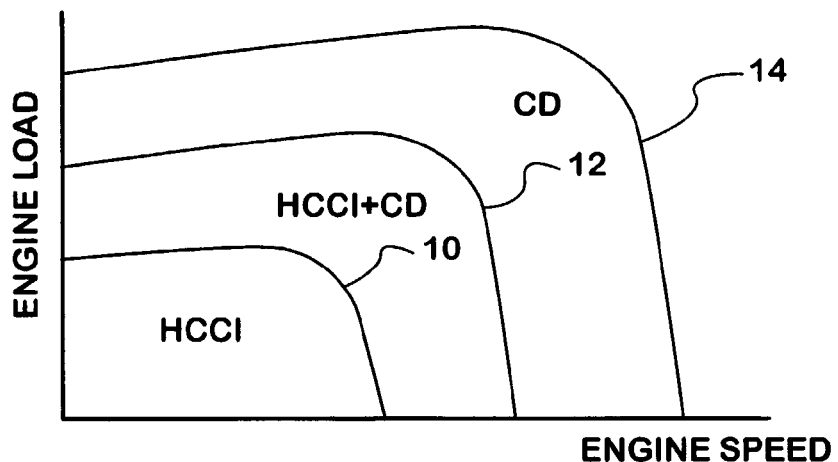
FIG. 1 is a representative graphic portrayal of fueling strategy in accordance with principles of a first embodiment of the present invention comprising an HCCI combustion mode for some speed-load conditions, an HCCI+CD combustion mode for other speed-load conditions, and a CD combustion mode for still other speed-load conditions.

FIG. 1 is a graph whose vertical axis represents engine load and whose horizontal axis represents engine speed. At the origin of the graph, engine load is zero, and engine speed is zero. Respective solid lines 10, 12, and 14 demarcate three zones labeled HCCI, HCCI+CD, and CD.

Zone HCCI covers an area that encompasses various combinations of relatively smaller engine loads and relatively lower engine speeds. Zone HCCI+CD covers an area that encompasses various combinations of relatively larger engine loads and relatively higher engine speeds than those of zone HCCI. Zone CD covers an area that encompasses various combinations of still relatively larger engine loads and still relatively higher engine speeds than those of zone HCCI+CD.

When a compression ignition engine is operating at a speed and load that falls within Zone HCCI, fuel is injected into the engine cylinders in a manner that creates HCCI combustion. When the engine is operating at a speed and load that falls within Zone HCCI+CD, fuel is injected into some engine cylinders in a manner that creates HCCI combustion in those cylinders, and into other engine cylinders, in a manner that creates CD combustion. When the engine is operating at a speed and load that falls within Zone CD, fuel is injected into the engine cylinders in a manner that creates CD combustion.

Figure 2:
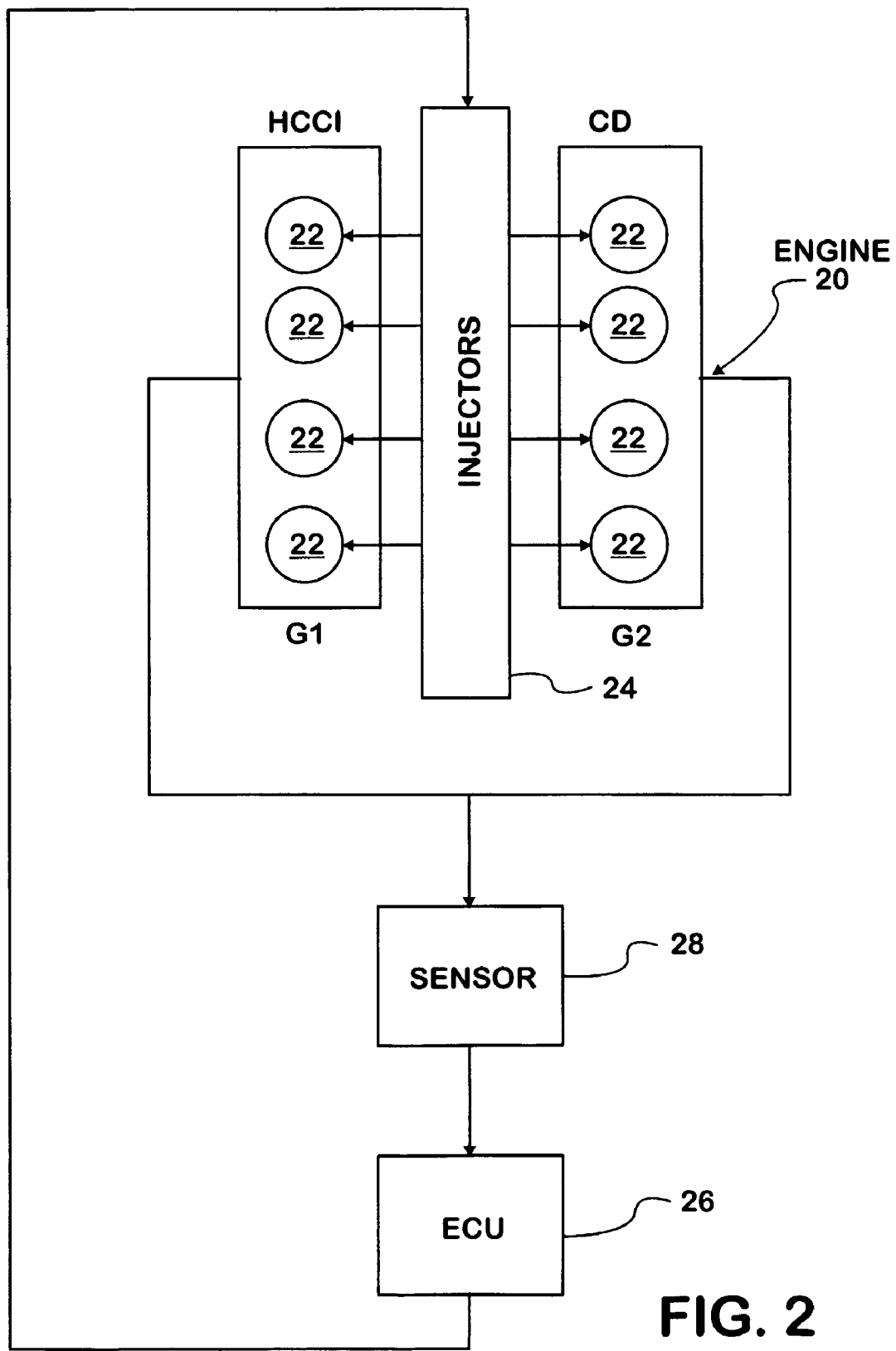
FIG. 2 is a general schematic diagram of portions of an exemplary diesel engine relevant to certain principles of the FIG. 1 embodiment of the present invention.

FIG. 2 shows schematically a portion of an exemplary turbocharged diesel engine 20 operating in accordance with the inventive strategy defined by FIG. 1 for powering a motor vehicle. Engine 20 comprises cylinders 22 within which pistons reciprocate. Each piston is coupled to a respective throw of a crankshaft by a corresponding connecting rod. Intake air is delivered to each cylinder through an intake system (not specifically shown in the drawing) when a respective intake valve is open.

The engine has a fueling system that comprises fuel injectors 24 for the cylinders 22. The engine also has a processor-based engine control unit (ECU) 26 that processes data from various sources to develop various control data for controlling various aspects of engine operation. The data processed by ECU 26 may originate at external sources, such as various sensors 28, and/or be generated internally. Examples of data processed may include engine speed, intake manifold pressure, exhaust manifold pressure, fuel injection pressure, fueling quantity and timing, mass airflow, and accelerator pedal position.

ECU 26 controls the injection of fuel into cylinders 22 by controlling the operation of the fueling system, including controlling the operation of fuel injectors 24. The processing system embodied in ECU 26 can process data sufficiently fast to calculate, in real time, the timing and duration of device actuation to set both the timing and the amount of each injection of fuel into a cylinder. Such control capability is used to implement the inventive strategy.

Regardless of how data values for engine speed and engine load are developed, this particular embodiment of the invention uses instantaneous engine speed and instantaneous engine load to select the particular fueling mode for the engine, either 1) the HCCI mode for creating HCCI combustion in all cylinders, 2) the HCCI+CD mode for creating HCCI combustion in some cylinders and CD combustion in others, or 3) the CD mode for creating CD combustion in all cylinders, and to then operate the fueling system to fuel the engine according to the strategy of the selected fueling mode. Alternately, a strategy may use only engine load to select the particular mode.

Figure 3:
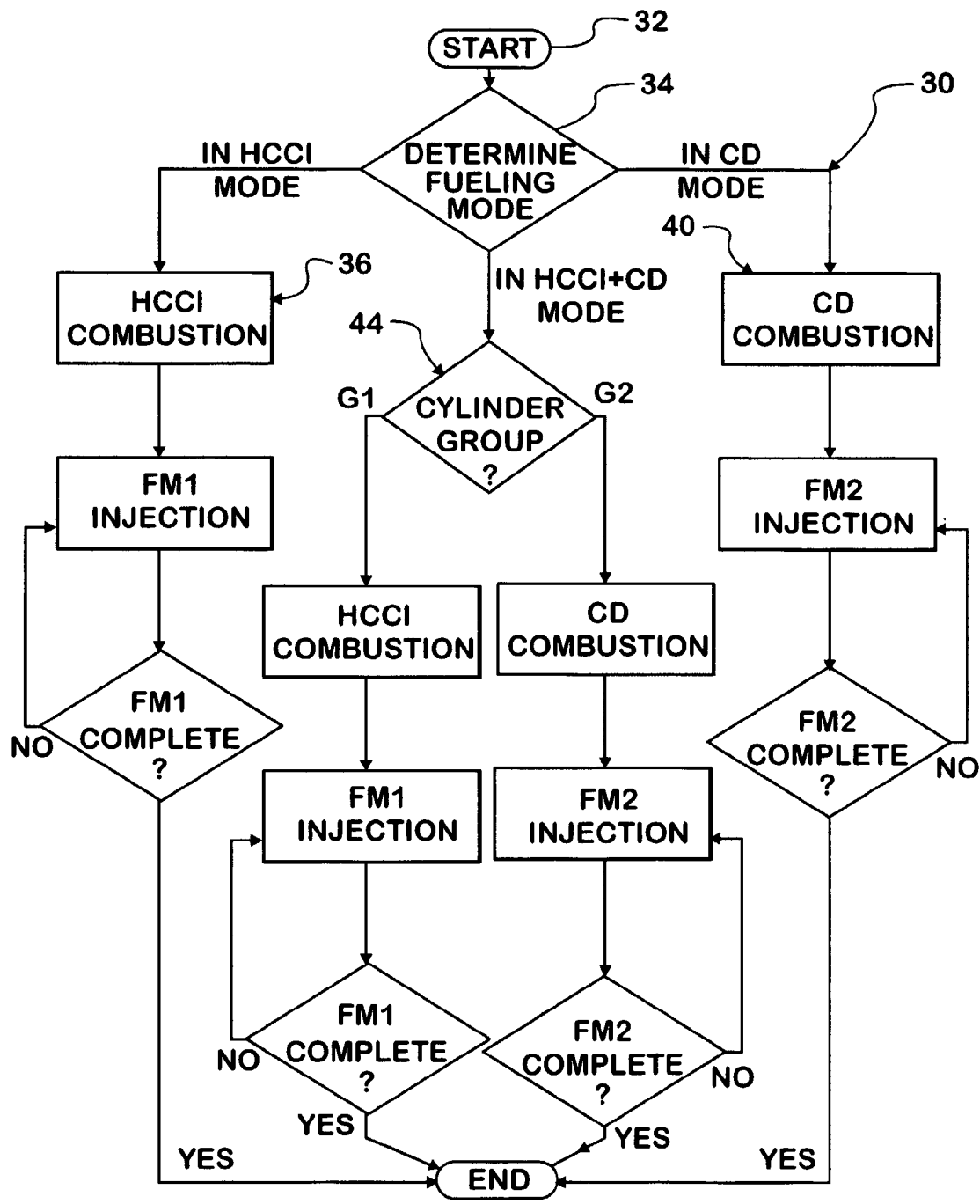
FIG. 3 is a flow diagram illustrating an embodiment of the inventive strategy utilized in the engine of FIG. 2.

FIG. 3 shows a flow diagram 30 for the inventive strategy as executed by the processing system of ECU 26. The reference numeral 32 represents the start of the strategy. A step 34 processes engine speed data and engine load data to determine which the three fueling modes of FIG. 1 is to be selected. One way of selecting the mode is by providing one or more maps in the processing system to define the three zones and comparing data values for instantaneous engine speed and engine load according to the maps.

Figure 4A:
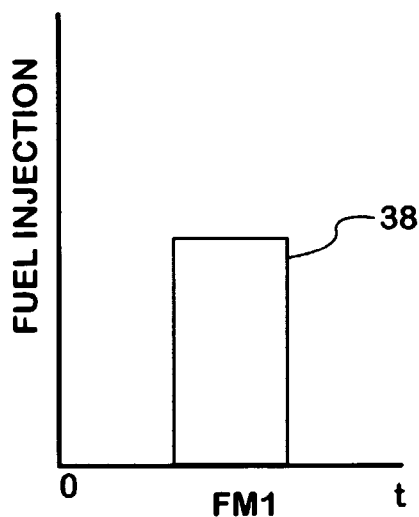
FIG. 4A illustrates a generic fuel injection according to a generic fueling map used for HCCI combustion.
Figure 4B:
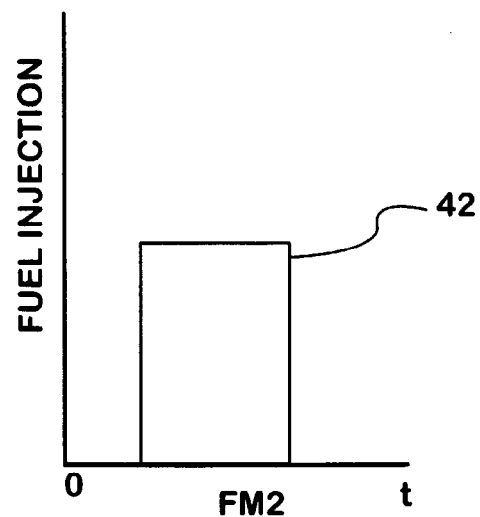
FIG. 4B illustrates a generic fuel injection according to a generic fueling map used for CD combustion.

When step 34 selects HCCI mode, diagram 30 discloses that fuel will be injected into each cylinder to create HCCI combustion in all cylinders (reference numeral 36). FIG. 4A illustrates a generic example of fueling for HCCI combustion, as represented by the rectangular zone 38 shown in a dimensionless graph of injection pressure versus crankshaft rotational position. FIG. 4B illustrates a generic example of fueling for CD combustion, as represented by the rectangular zone 42 shown in a graph of injection pressure versus time.

Fueling for HCCI combustion differs from fueling for CD combustion in several ways that can be seen by comparing FIG. 4A with FIG. 4B.

In each Figure, the distance along the horizontal axis from the origin to the beginning of the corresponding zone 38, 42 represents timing of injection during an engine cycle. It can be seen that timing for CD combustion is advanced relative to that for HCCI combustion.

It can also be seen that the duration of injection, represented by the width of each zone, is longer for CD combustion than for HCCI combustion. Fuel injection pressure, represented by the height of each zone, is substantially the same for both HCCI and CD combustion.

Within either zone 38 or 42, actual injection may take place in any manner suitable for causing the respective type of combustion. For example, HCCI combustion may result from one or more discrete injections, but regardless of the number of discrete injections, the HCCI mode introduces fuel into a cylinder during a compression upstroke of the piston that reciprocates in the cylinder. The fuel mixes with charge air that entered the cylinder during the immediately preceding intake downstroke and early portion of the compression upstroke so that the resulting air-fuel mixture is a substantially homogeneous one. The fueling concludes before any combustion occurs. When the charge has been compressed sufficiently to auto-ignite, HCCI combustion commences.

When step 34 selects CD mode, diagram 30 discloses that fuel will be injected into each cylinder to create CD combustion in all cylinders (reference numeral 40). CD combustion may result from one or more discrete injections, but regardless of the number of discrete injections, the CD mode introduces fuel into a cylinder near the top of a compression upstroke of the piston that reciprocates in the cylinder. The fuel mixes with charge air that has been compressed to pressure sufficiently great to cause CD combustion to occur as fuel is being injected.

When step 34 selects HCCI+CD mode, diagram 30 discloses a step 44 that causes fuel to be injected to create HCCI combustion in some cylinders and CD combustion in others. FIG. 2 shows an example of a V-type engine have two banks of cylinders G1, G2, each containing equal numbers of cylinders.

During the HCCI+CD mode, the cylinders of bank G1 are fueled to cause HCCI combustion to occur in them while the cylinders of bank G2 are fueled to cause CD combustion to occur in them. The cylinders of bank G1 are fueled in the manner of FIG. 4A while those of bank G2 are fueled in the manner of FIG. 4B. For any given speed in the HCCI+CD mode, the fuel delivered into the HCCI cylinders is fixed, i.e., the fuel map (injection pressure, duration, and timing) is substantially constant, and does not change as load changes. However, as the engine speed changes in the HCCI+CD mode from one speed to another, the fuel delivered into HCCI cylinders changes from one fixed amount corresponding to maximum allowable fueling at the former speed to another fixed amount corresponding to the maximum allowable fueling at the new speed. Hence, HCCI fueling is a function of engine speed, but not engine load in the HCCI+CD mode.

For any given engine speed in the HCCI+CD mode, fueling changes only for the CD cylinders, changing as a function of the load change. Fueling for the CD cylinders may also change as a function of engine speed in this mode.

The selection of those cylinders that are to be fueled in one way and those that are to be fueled in the other way may be fixed or variable. In other words it is possible that in the HCCI+CD mode, a particular cylinder may be fueled in one way at certain times and in the other way at other times. The strategy iterates at a suitable rate to assure that load/speed changes are promptly followed and the appropriate fueling mode performed. In HCCI+CD mode, a firing order where HCCI and CD alternate may serve to minimize torque fluctuations.

When a cylinder is to be fueled for HCCI combustion, the processing system utilizes a corresponding fueling map or maps that provide fueling parameters suited for causing fuel to be injected consistent with zone 38 for the particular engine speed and load. In the HCCI mode, fueling of all cylinders changes as a function of both engine speed and engine load. In the HCCI+CD mode, fueling of the HCCI cylinders changes only as a function of engine speed, not load. When a cylinder is to be fueled for CD combustion, the processing system utilizes a corresponding fueling map or maps that provide fueling parameters suited for with causing fuel to be injected consistent with zone 42 for the particular engine speed and load. In both HCCI+CD mode and CD mode, fueling of CD cylinders is a function of both engine speed and engine load. Hence in FIGS. 3, 4A, and 4B, the designation FM1 represents fueling maps for HCCI combustion and the designation FM2 represents fueling maps for CD combustion.

The invention has the following advantages:
1) It can concurrently reduce $NO_x$ and soot.
2) It has high thermal efficiency.
3) It can cover the whole operating range of an engine.
4) It can be used in heavy-duty, medium-duty, and light-duty diesel engines.
5) The invention can be implemented in the processor alone, provided that the processor has sufficient capacity, and this makes the invention quite cost-effective.

The fueling strategy portrayed in FIG. 1 assumes that the engine has warmed up to desired operating temperature. A different or modified strategy may be used when a cold engine is started and begins to warm up.

It is to be noticed that an engine embodying the invention is a true diesel engine, unlike engines described in certain other patents that include port fuel injectors in addition to in-cylinder diesel fuel injectors, and/or sparking devices, and/or that run on dual fuels. Principles of the preferred embodiment of the invention that has been shown and described herein contemplate only in-cylinder injection of diesel fuel.

While a presently preferred embodiment of the invention has been illustrated and described, it should be appreciated that principles of the invention apply to all embodiments falling within the scope of the following claims.

What is claimed is:

1. A compression ignition engine comprising:
   a control system for processing data;
   one or more combustion chambers; and
   a fueling system for injecting fuel into the one or more combustion chambers;
   wherein the control system controls the fueling system using a result of the processing of certain data by the control system to select one of plural fueling modes for operating the engine such that
   a) when the result of the processing selects a first fueling mode, each of multiple combustion chambers is fueled to create a substantially homogeneous air-fuel charge within each such combustion chamber during a corresponding engine cycle and each such charge is compressed to auto-ignition without the introduction of any additional fuel after auto-ignition during that corresponding engine cycle,
   b) when the result of the processing selects a second fueling mode,
      i) a first group of the combustion chambers is fueled to create a substantially homogeneous air-fuel charge within each combustion chamber of the first group during a corresponding engine cycle such that for any given engine speed, the amount of fuel delivered into each combustion chamber of the first group is a function of engine speed but not engine load, and each charge is compressed to auto-ignition without the introduction of any additional fuel after auto-ignition during that corresponding engine cycle, and
      ii) a second group of the combustion chambers is fueled by the introduction of fuel at a time during the engine cycle when air in the corresponding combustion chamber of the second group has been compressed sufficiently to cause the fuel to combust as it is being introduced, and
   c) when the result of the processing selects a third fueling mode, each of the combustion chambers is fueled by the introduction of fuel at a time during the engine cycle when air in the corresponding combustion chamber has been compressed sufficiently to cause the fuel to combust as it is being introduced.

2. An engine as set forth in claim 1 wherein for any given speed during the second fueling mode, the amount of fuel delivered into each combustion chamber of the first group is substantially constant, and does not change as load changes, but as the engine speed changes from one speed to another, the fuel delivered into each combustion chamber of the first group changes from a certain substantially constant amount corresponding to maximum allowable fueling at the former speed to a different substantially constant amount corresponding to the maximum allowable fueling at the new speed.

3. An engine as set forth in claim 2 wherein for any given speed during the second fueling mode, the amount of fuel delivered into each combustion chamber of the second group is a function of engine load.

4. An engine as set forth in claim 3 wherein the amount of fuel delivered into each combustion chamber of the second group is also a function of engine speed.

5. An engine as set forth in claim 1 wherein the certain data comprises data indicative of engine load.

6. An engine as set forth in claim 5 wherein the certain data comprises data indicative of engine speed.

7. An engine as set forth in claim 1 wherein, with the engine warmed up to operating temperature, in a graph of engine speed vs. engine load whose origin corresponds to zero speed and zero load, the first fueling mode occurs at engine speeds and loads within a first zone of the graph that bounds the origin, the second fueling mode occurs at engine speeds and loads within a second zone that bounds the first zone, and the third fueling mode occurs at engine speeds and loads within a third zone that bounds the second zone.

8. An engine as set forth in claim 1 further including a fuel injection system that introduces fuel into the combustion chambers by injection, and wherein the control system controls the pressure at which fuel is injected into both groups of cylinders during the second mode such that the injection pressure is substantially the same for both groups.

9. An engine as set forth in claim 8 wherein the control system further controls the duration of fuel injection during the second mode such that the duration of fuel injection for one group is different from the duration of fuel injection for the other group.

10. An engine as set forth in claim 9 wherein the control system further controls the timing of fuel injection including controlling the timing of fuel injection such that during the second mode the timing for the one group is different from the timing for the other group.

11. An engine as set forth in claim 1 further including in-cylinder fuel injectors that perform all fueling of the combustion chambers in all three modes by direct injection of fuel into the combustion chambers.

12. A method of operating a compression ignition engine comprising:
    processing certain data to select one of plural fueling modes for operating the engine, and
    a) when the result of the processing selects a first fueling mode, fueling each of multiple combustion chambers to create a substantially homogeneous air-fuel charge within each such combustion chamber during a corresponding engine cycle and compressing each charge to auto-ignition without introducing any additional fuel after auto-ignition during that corresponding engine cycle,
    b) when the result of the processing selects a second fueling mode,
       i) fueling a first group of the combustion chambers to create a substantially homogeneous air-fuel charge within each combustion chamber of the first group during a corresponding engine cycle such that for any given engine speed, the amount of fuel delivered into each combustion chamber of the first group is a function of engine speed but not engine load, and compressing each charge to auto-ignition without introducing any additional fuel after auto-ignition during that corresponding engine cycle, and
       ii) fueling a second group of the combustion chambers by introducing fuel at a time during the engine cycle when air in the corresponding combustion chamber of the second group has been compressed sufficiently to cause the fuel to combust as it is being introduced, and
    c) when the result of the processing selects a third fueling mode, fueling each of the combustion chambers by introducing fuel at a time during the engine cycle when air in the corresponding combustion chamber has been compressed sufficiently to cause the fuel to combust as it is being introduced.

13. A method as set forth in claim 12 wherein for any given speed during the second fueling mode, the amount of fuel delivered into each combustion chamber of the first group is substantially constant, and does not change as load changes, but as the engine speed changes from one speed to another, the fuel delivered into each combustion chamber of the first group changes from a certain substantially constant amount corresponding to maximum allowable fueling at the former speed to a different substantially constant amount corresponding to the maximum allowable fueling at the new speed.

14. A method as set forth in claim 13 wherein for any given engine speed during the second fueling mode, the amount of fuel delivered into each combustion chamber of the second group is a function of engine load.

15. A method as set forth in claim 14 wherein during the second fueling mode the amount of fuel delivered into each combustion chamber of the second group is also a function of engine speed.

16. A method as set forth in claim 12 wherein the step of processing certain data to select one of plural fueling modes for operating the engine comprises processing data indicative of engine load.

17. A method as set forth in claim 16 wherein the step of processing certain data to select one of plural fueling modes for operating the engine comprises processing data indicative of engine speed.

18. A method as set forth in claim 12 wherein, with the engine warmed up to operating temperature, in a graph of engine speed vs. engine load whose origin corresponds to zero speed and zero load, step a) occurs at engine speeds and loads within a first zone of the graph that bounds the origin, step b) occurs at engine speeds and loads within a second zone that bounds the first zone, and step c) occurs at engine speeds and loads that bound the second zone.

19. A method as set forth in claim 12 wherein fuel is introduced into the combustion chambers by injection, and further including controlling the pressure at which fuel is injected into both groups of cylinders such that the injection pressure is substantially the same for both groups.

20. A method as set forth in claim 19 further including controlling the duration of fuel injection such that during the second mode, the duration of fuel injection for one group is different from the duration of fuel injection for the other group.

21. A method as set forth in claim 20 further including controlling the timing of fuel injection such that during the second mode the timing for the one group is different from the timing for the other group.

22. A method as set forth in claim 12 wherein in all three modes, all fueling of the combustion chambers is performed by injecting fuel directly into the combustion chambers from in-cylinder fuel injectors.

\* \* \* \* \*